United States Patent
Bauer et al.

(10) Patent No.: US 6,274,111 B1
(45) Date of Patent: *Aug. 14, 2001

(54) SYNTHETIC MAGNESIUM SILICATE

(75) Inventors: Harald Bauer, Kerpen; Günther Schimmel, Erftstadt; Volker Thewes, Monheim, all of (DE)

(73) Assignee: Clariant GmbH, Frankfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/107,896

(22) Filed: Jun. 30, 1998

(30) Foreign Application Priority Data

Jul. 1, 1997 (DE) .............................. 197 27 894

(51) Int. Cl.⁷ .......................... C01B 33/22; C01B 33/40
(52) U.S. Cl. .................. 423/331; 423/332; 423/333; 423/334; 423/341; 502/80
(58) Field of Search ................... 423/331, 332, 423/333, 334, 341; 502/80

(56) References Cited

U.S. PATENT DOCUMENTS

| | | |
|---|---|---|
| 3,586,478 | 6/1971 | Neumann . |
| 3,666,407 * | 5/1972 | Orlemann ........................ 423/331 |
| 3,671,190 * | 6/1972 | Neumann ........................ 423/331 |
| 3,855,147 * | 12/1974 | Granquist ........................ 423/328.2 |
| 4,040,974 | 8/1977 | Wright et al. . |
| 4,049,780 | 9/1977 | Neumann . |
| 4,054,537 | 10/1977 | Wright et al. . |
| 4,075,126 * | 2/1978 | Stridde ........................ 502/61 |
| 5,308,808 * | 5/1994 | Gregar et al. ................ 423/328.1 |

FOREIGN PATENT DOCUMENTS

| | | |
|---|---|---|
| 1 184 742 | 9/1965 | (DE) . |
| 1 567 503 | 8/1970 | (DE) . |
| 1 667 502 | 6/1971 | (DE) . |
| 23 56 865 C2 | 12/1984 | (DE) . |
| 279234 | 5/1990 | (DE) . |
| 0 088 372 A1 | 9/1983 | (EP) . |
| 0088372 | 9/1983 | (EP) . |
| 0537064 | 4/1993 | (EP) . |
| 1054111 | 1/1967 | (GB) . |
| 1121501 | 7/1968 | (GB) . |
| 1213122 | 11/1970 | (GB) . |
| 1432770 | 4/1976 | (GB) . |
| 35-818431 * | 10/1983 | (JP) . |
| 9-249412 * | 9/1997 | (JP) . |
| WO 92/21612 | 12/1992 | (WO) . |
| WO 93/11069 | 6/1993 | (WO) . |

* cited by examiner

*Primary Examiner*—David Sample
(74) *Attorney, Agent, or Firm*—Susan S. Jackson; Scott E. Hanf

(57) ABSTRACT

The invention relates to a synthetic magnesium silicate having a layered crystalline structure, to a process for its preparation and to its use.

13 Claims, No Drawings

SYNTHETIC MAGNESIUM SILICATE

BACKGROUND OF THE INVENTION

The invention relates to a synthetic magnesium silicate having a layered crystalline structure, to a process for its preparation and to its use.

Synthetic hectorites are trioctahedral sheet silicates of the smectite type of the formula

where $0<x<1.2$ and $0<y<4$ and M is a cation having a valency z (z is 1, 2 or 3). Because of their rheological properties, they are widely used in thickening systems (thixotropic agents). A number of processes are known for preparing synthetic hectorites.

DE-A-11 84 742 describes a process for the preparation of a synthetic mineral of the hectorite type having improved rheological properties, in which a solution containing magnesium ions and an alkaline sodium silicate solution are introduced into a third solution containing lithium ions and fluoride ions, and then the reaction mixture is heated with agitation until a sample of the product therefrom, after filtration, washing and drying at 110° C., forms a gel in a 5% by weight dispersion in water. The product is worked up and heated at from 110 to 450° C. in order to develop useful aqueous gelling properties.

DE-A-15 67 503 describes an analogous process, although the product is reacted in aqueous solution with an amine salt prior to the heat treatment at from 110 to 450° C. Both processes give products which are able to form organic adducts.

Both processes, however, have the disadvantage that considerably long reaction times are necessary and also that precise control of the quality of the final product is very difficult.

British patent GB-B-1 432 770 describes a process for the preparation of an anhydrous magnesium silicate having a crystalline structure similar to hectorite, in which firstly a magnesium salt is reacted with a sodium carbonate solution to give magnesium carbonate and then a sodium silicate solution is added to precipitate silicon dioxide. The resulting suspensions are then boiled for 1 hour at atmospheric pressure and then treated hydrothermally at 207° C. for from 3 to 6 hours.

These processes produce fluoride-free products whose optical density and whose Bingham yield values (2% strength dispersion in tap water containing 140 mg of $CaCO_3/l$) are measured.

Another process for the preparation of fluoride-free anhydrous magnesium silicates is described in DE-C-23 56 865. This involves dissolving a water-soluble magnesium compound in an aqueous medium and adding an aqueous alkaline solution of one or more sodium compounds to the aqueous medium to precipitate a water-insoluble magnesium compound, and then precipitating silicon dioxide in the aqueous suspension containing the water-insoluble magnesium compound. In this process, the magnesium compound and the silicon dioxide are precipitated together.

PCT/WO 93/11069 describes a process for the preparation of a synthetic hectorite, which involves preparing, under basic conditions, a precursor in solid form which already has the Mg/Si ratios of the subsequent hectorite. This precursor is prepared in a narrow pH range between 7.5 and 9 or between 9.7 and 10. The precursor is then crystallized in a hydrothermal method to give the actual hectorite product. Exact pH control and adherence to constant values is said to produce a product having improved properties.

In U.S. Pat. No. 3,586,478, a synthetic sheet silicate of the hectorite type is obtained by preparing an aqueous mixture of a water-soluble magnesium salt, sodium silicate, sodium carbonate or sodium hydroxide solution and a solution containing Li and F ions, and treating this mixture hydrothermally at the boiling point and atmospheric pressure for from 10 to 20 hours in order that the product crystallizes out. Following washing and drying, a product in which the cations and anions are present in certain quantity ratios relative to one another is obtained.

DE-A-16 67 502 describes a process for the preparation of a F-free synthetic clay mineral, which involves adding to a first aqueous solution which contains magnesium ions and lithium ions, a second solution which contains sodium carbonate and sodium silicate, with formation of a white precipitate. The resulting mixture is then heated, and after a relatively long period under pressure, a product crystallizes out, which is washed and dried.

In the process of GB-A-1 054 111, a synthetic clay mineral is prepared by heating an aqueous solution containing lithium ions and magnesium ions to boiling point and slowly adding a sodium silicate solution thereto. An aqueous sodium carbonate solution is then added. Following hydrothermal treatment, the product is filtered, washed, dried and ground.

EP-A-0 088 372 describes a process for the preparation of a synthetic hectorite which involves heating an aqueous solution of a magnesium salt to from 110 to 373° C., adding lithium ions and/or fluoride ions and then adding a source of sodium and silicon.

DE-A-27 18 576 describes a very specific process for the preparation of a material comprising a fluorine-containing trioctahedral clay of the smectite type, in which, inter alia, a silicon dioxide sol is added. The Bingham yield points of the resulting products are only useful for a few areas of application.

U.S. Pat. No. 4,049,780 likewise describes a complex process for the preparation of synthetic silicates which also produces products which have inadequate Bingham yield points for many practical applications.

Many of the abovementioned processes have the disadvantage that the space-time yields are low and that the product properties cannot be uniformly reproduced very easily. Many processes also appear to be very time-consuming and economically unfavorable. In some cases, the resulting products and their properties vary very greatly as regards their composition and quality. Moreover, it is often not possible to prepare products which have certain values as regards yield points in the corresponding electrolyte solutions or which have high fiber affinity.

SUMMARY OF THE INVENTION

The object of the invention is thus to provide a synthetic silicate which has reproducible, precisely defined properties and, particularly in aqueous solutions having a low electrolyte content or in aqueous solutions having a high electrolyte content, exhibits pseudoplasticity. In addition, the product is to have high affinity to textile fibers.

The object is achieved by a synthetic magnesium silicate having a layered crystalline structure of the formula

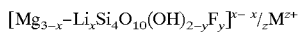
$$[Mg_{3-x}-Li_xSi_4O_{10}(OH)_{2-y}F_y]^{x-} \, {}^{x/z}M^{z+}$$

where $0.1 \leq x \leq 0.4$ and $0 < y \leq 2$, M is an alkali metal ion having a valency z and in which the relationship of the fluorine content $[c_F]$ to the silicon content $[c_{si}]$ is $c_F[mol] = -1.92 \, c_{si}[mol] + b$ where $b = 2.18$ to $2.02$.

Preferably, $0.21 \leq x \leq 0.33$.

Particularly preferably, $0.21 \leq x \leq 0.28$.

Preferably, the novel synthetic magnesium silicate having a layered crystalline structure produces high pseudoplasticity in aqueous solutions with a low electrolyte content.

Preferably, the novel synthetic magnesium silicate having a layered crystalline structure produces high pseudoplasticity in aqueous solutions having a high electrolyte content.

The novel synthetic magnesium silicate having a layered crystalline structure preferably has a high affinity to textile fibers.

The invention also relates to a process for the preparation of synthetic magnesium silicates having a layered crystalline structure according to the abovementioned formula, which comprises reacting an aqueous $MgSO_4$ solution with an aqueous solution containing lithium ions and fluoride ions, and subsequently adding a silicon compound.

DESCRIPTION OF THE PREFERRED EMBODIMENT

The novel process is preferably carried out such that, after addition of the silicon compound the reaction mixture is heated and maintained at this temperature for from 2 to 24 hours, then cooled, and the magnesium silicate is separated off from the byproducts, then washed and worked up.

The reaction mixture is preferably heated at from 100 to 320° C.

The reaction mixture is particularly preferably heated at from 170 to 220° C. for from 3 to 8 hours.

In the novel process, the molar ratios in the reaction mixture are as follows:

Mg/Si=0.7144 to 0.6405
Li/Si=0.02464 to 0.09854
F/Si=0.4009 to 0.4899
Na/Si=0.9514 to 2.0298
$H_2O$/Si=13.9947 to 42.7536

In preferred meanings, the Mg/Si molar ratio is from 0.6873 to 0.6578 and the Li/Si molar ratio is from 0.05173 to 0.0813.

In particularly preferred meanings, the Mg/Si molar ratio is from 0.6873 to 0.6701 and the Li/Si molar ratio is from 0.05173 to 0.0898.

The magnesium silicate obtained by the preceding process steps is preferably subsequently ground.

The invention also relates to the use of synthetic sheet silicates of the hectorite type, obtained by the above-described process, for the preparation of or for use as a rheology additive, for clarifying and purifying beverages, as a catalyst or catalyst support, adsorbent, binder and/or filler, (dissolution) additive for crop-protection formulations, dispersant, builder, fabric softener, carrier substance for other materials and as an additive.

The silicate source may be sodium silicates in solid form (solid water glasses) or in dissolved form (water glasses) Preference is given to those having an $Na_2O:SiO_2$ ratio of 1:2 (sodium disilicate, for example type 3Na from Société Francaise Hoechst) or 1:3.5 (soda water glass, for example type 4/1 from Société Francaise Hoechst).

The alkalis used are preferably sodium hydroxide and sodium carbonate in a variable ratio. By using silicates having appropriate $Na_2O:SiO_2$ ratios, it is possible to dispense with the addition of more alkali.

The magnesium salt used is preferably magnesium sulfate. Also suitable are magnesium hydroxide carbonate, magnesium fluoride, etc. or mixtures of the abovementioned salts.

The lithium salt is preferably lithium carbonate. Also suitable are lithium sulfate, lithium hydroxide, etc. or mixtures thereof.

The fluoride source is preferably hydrofluoric acid. Also suitable are alkali metal fluorides and alkaline earth metal fluorides or mixtures thereof. The alkaline earth metal fluorides can also be prepared in situ by reaction of alkaline earth metal oxides, hydroxides, carbonates and/or hydroxycarbonates with hydrofluoric acid.

The novel process can be carried out industrially in a variety of ways. Thus, in the case of batch preparation, a solution constituting the lithium and fluoride source is added to a saturated magnesium sulfate solution. An alkaline sodium silicate solution is then added.

The addition of the alkaline sodium silicate solution can be carried out in a broad temperature range from 0 to 300° C. Preference is given to temperatures in the range from 20 to 50° C. and also room temperature. The resulting reaction mixture (also referred to below as suspension) is heated to temperatures between 70 and 300° C. under the autogenous vapor pressure of the solution and left at the appropriate temperature for a period of from 0.5 to 20 hours. The procedure preferably involves heating the whole suspension at from 170 to 230° C. for from 4 to 10 hours.

The whole suspension is then cooled to below 100° C. This can be carried out by direct cooling, or else by indirect cooling, for example by means of reactor jacket cooling or by expansion of the suspension into another container.

In the case of a continuous process, the solutions may also be metered into a high-pressure container continuously. The average residence time should be from 3 to 6 hours. Here, the corresponding amount of reaction mixture is simultaneously discharged from the reactor.

The resulting suspension contains, as insoluble component, synthetic magnesium silicate and, as byproducts, dissolved sodium sulfate and the carbonates and hydroxides used to regulate the pH, and small amounts of residual ions used. The amount of sodium sulfate varies depending on the magnesium sulfate feed amount and can, if desired, be reduced by using magnesium hydroxide or magnesium fluoride.

The novel process uses considerably lower $H_2O/SiO_2$ ratios (according to the invention from about 14:1 to 43:1) than the prior art processes which require a $H_2O/SiO_2$ ratio of from 53:1 to over 155:1, meaning that a particularly economic process is now available.

For certain applications, for example in detergents, the resulting suspension can be used after drying without further purification. For other applications, for example in surface coatings, the end product must, on the other hand, be extremely pure. The various purification processes and their efficiency are described in more detail below.

Accordingly, the suspension produced by the process of the invention, which still contains the aforementioned constituents, can be subsequently purified. For this purpose, the sodium sulfate formed in the suspension is removed by utilizing its solubility behavior. Under the concentration ratios of the claimed process, the majority of the sodium sulfate can be removed by targeted crystallization and decantation of the depleted suspension.

The resulting suspension can be further purified by filtration, for example in a vacuum drum filter, a filter press or a belt filter. Filtration according to the cross-flow principle, which avoids the formation of a filter cake by generating a high flow rate, produces products which have particularly low electrolyte contents.

The present suspension can also be washed out by centrifugation, in which case sufficiently low-electrolyte products are likewise obtained, although they are not as low in electrolytes as after cross-flow filtration. The suspension is washed by repeated centrifugation, decantation of the supernatant solution and resuspension of the heavier phase with water. This process is repeated until the conductivity of the suspension is below a predetermined value. On a larger scale, the desired product is washed continuously with water.

Drying is, for example, carried out in a vacuum drying cabinet or using a belt drier. An advantageous procedure involves firstly drying on a belt drier until agglomeration (water content about 80–85%), and then drying convectively, i.e. with aerated bulk material, at about 130° C. on another belt drier.

Relatively large quantities are preferably dried in a spray tower. Here, the suspension is atomized using a nozzle and either mixed cocurrently with a hot-gas stream or passed countercurrently to a hot-gas stream. It is possible to use one-component and two-component nozzles, the latter producing a more uniform flow of material when using a corresponding stream of air. As far as the bottom of the spray tower is concerned, the novel synthetic sheet silicate already has the ultimate particle size distribution, i.e. the proportion of particles<53 $\mu$m is about 20%, the proportion of particles<100 $\mu$m is about 60%, the proportion of particles<200 $\mu$m is about 80% and the proportion of particles>200 $\mu$m is about 20%, meaning that the abovementioned sheet silicate does not normally require additional comminution by grinding.

In order to obtain a particularly readily soluble product in the novel process, the ignition loss should be about 15%. If the ignition loss is considerably less than this value, then the dissolution rate decreases.

The synthetic sheet silicate of the hectorite type having a composition conforming to an Li/Si ratio of from 0.0246 to 0.0985, prepared by the novel process, crystallizes into considerably larger particles than other synthetic sheet silicates of the hectorite type. For example, the mean diameter ($d_{50}$) of the particles of the novel sheet silicate in Example 1 is about 133 nm (in 2% strength aqueous dispersion), and is thus significantly larger than the mean diameter of the particles of a commercially available synthetic magnesium silicate ($d_{50}$ about 70 nm). This relatively large particle diameter is advantageous for many areas of application.

Areas of application for the synthetic sheet silicate of the hectorite type prepared by the novel process are, for example, in the drinks industry for clarifying and purifying wine, must, fruit juice, sugar juice and sugar syrup, catalyst and catalyst supports, additive for crop-protection agents (fungicides, herbicides), adsorbents in water and waste water purification, care products and polishes, dispersant, builder, fabric softener in detergents, cleaners and care products, carrier substance for constituents of detergents, cleaners and care products, bases for ointments and cosmetics, rheology additive (thickeners, thixotropic agents, stabilizers and antisettling agents) for paints, varnishes, surface coatings (including water-based ones), joint compounds, tile adhesives (for example dispersion-based ones), lutes, waxes and adhesives, additive in ceramic production processes and for glazes, additive for drilling liquids, additive for molding sand binders for foundry purposes.

The novel synthetic magnesium silicate having a layered crystalline structure displays the following favorable properties:

in aqueous solutions with a low electrolyte content, it exhibits very good pseudoplasticity, in aqueous solutions with a high electrolyte content, it exhibits very good pseudoplasticity, and it has a high affinity to textile fibers.

The novel synthetic sheet silicates of the hectorite type were also tested for their Theological properties.

It is known that clay minerals produce aqueous solutions having pseudoplastic Theological behavior (K. Jasmund et al., Tonminerale und Tone, Steinkopf-Verlag 1993). A characteristic of this behavior is the appearance of a yield point. This occurs with plastic flow behavior, i.e. the material begins to flow only above a minimum shear stress. The observed viscosity often decreases by more than several orders of magnitude (shear liquefaction). Below the yield point, the plastic substance behaves as a solid. The appearance of the abovementioned yield point is heavily dependent on the nature and the concentration of the electrolytes present in the solution. Usually, the yield point in electrolyte-free or low-electrolyte solutions gives only small shear stress values. With increasing electrolyte concentration, the yield point also shows higher values. Only at considerably higher electrolyte concentrations is a maximum exceeded and the yield point decreases again.

The yield point property is used to adjust the rheology of dispersions, emulsions, etc. Their behavior can be influenced favorably.

In certain applications such as, for example, cosmetics, surface coatings and emulsion paints, a low electrolyte content is always required. On the other hand, in construction, for example, as high an electrolyte tolerance as possible is required, i.e. the silicate still has the Theological properties even at a particularly high salt content.

Correspondingly purified silicates originating from a reaction mixture having a Mg/Si ratio of from 0.6849 to 0.6750 and an Li/Si ratio of from 0.05420 to 0.06405 display particular Theological properties in low-electrolyte aqueous solution, in particular higher yield points than the known synthetic and natural hectorites, montmorillonites or bentonites.

Novel synthetic magnesium silicates originating from a reaction mixture having an Mg/Si ratio of from 0.6627 to 0.6528 and an Li/Si ratio of from 0.0764 to 0.0862 also have useful yield point values at particularly high electrolyte contents in aqueous solution. The electrolyte tolerance is higher than in the case of comparable pure synthetic hectorites and pure natural montmorillonites.

To determine the Theological properties, 1.8 g of sample substance are dispersed in 80 g of deionized water using a disperser (Ultra Turrax) and left to stand for 24 hours. The sample is measured using a plate/plate measurement arrangement having a shear-stress-controlled rheometer (Carri-med-50 viscometer). For this purpose, the sample is firstly presheared at a shear rate which increased linearly from $250\ s^{-1}$ to $750\ s^{-1}$, followed by a resting period of 4 minutes.

The yield point can be determined experimentally from the shear stress/shear rate diagram as the point at which rotational movement (shear rate) first starts while the shear stress is being increased.

Surprisingly, we have also found that the novel synthetic sheet silicates have a considerably higher affinity to textiles than the natural sheet silicates customarily used for washing applications. When a solution like a wash liquor is used, the silicates adhere to the textiles not only in accordance with their concentration, but attach to the fibers from the solution overproportionately.

The silicates can also be used as carriers for other substances used in the washing process which themselves do not have an affinity to fibers, such as bleaches, enzymes, etc. These may be deposited adsorptively on the surface of the silicates, in the sense of an ion exchange, or be inserted into the silicates as polar substances. Substances can also be bonded to the silicates by direct covalent bonds.

The amount of silicate remaining on the fabric relative to the amount of silicate used (100%) is referred to as the coating yield [%]. As a rule, duplicate determinations are carried out and the mean value determined.

To determine the fiber affinity, a textile section (22.5 g of cotton-terry) is treated with 200 ml of deionized water (conductivity about 0.01 mS) in which 75 mg of synthetic silicate have been dissolved in a rotating round glass flask which has been heated in a heatable water bath. Sodium hydroxide solution is used to adjust the pH to 10.4 and aqueous NaCl solution is used to adjust the conductivity to 1.2 mS.

The prewash is simulated by treatment for 5 minutes at about 20° C., followed by the main wash at 60° C. (treatment for 15 minutes). The solution and the textile section are then treated with 20 ml of tap water (20° C., 5 minutes) and cooled. The rinsing operations are simulated by repeated washing, each time using 85 ml of water. The samples are then dried for 15 hours in a drying cabinet at 80° C. The coating is determined by elemental analysis (Mg content compared with blank value) of the dried textile section.

EXAMPLE 1

3 Solutions Are Firstly Prepared

Solution 1

351 g of $MgSO_4.7H_2O$ are dissolved in 320 g of $H_2O$ in a beaker.

Solution 2

31.4 g of NaOH (50% by weight) and 5.00 g of $Li_2CO_3$ are suspended in 315 g of water, and 47 g of hydrofluoric acid (40% HF) are added dropwise with cooling and stirring. The evolution of $CO_2$ causes a high degree of foaming.

Solution 3

46 g of NaOH (100% by weight), 39 g of $Na_2CO_3$ and 446.7 g of water glass (8.3% by weight of $Na_2O$, 27.8% by weight of $SiO_2$, type: 4/1, manufacturer: Société Francaise Hoechst) are dissolved in 480 g of water.

Solution 2 is added to solution 1 at room temperature with vigorous stirring using a paddle stirrer, and then solution 3 is slowly added with further vigorous stirring. The mixture is then stirred for a further 5 hours at 200° C.

The suspension, which has a pH=9.2, is then cooled and washed by repeated centrifugation, decantation of the supernatant salt solution and resuspension of the heavier phase with a total of 8 l of demineralized water, until the conductivity of the suspension is below 2.8 mS.

Drying at 80° C. in a drying cabinet and grinding in a cross-beater mill gave 189 g of product. Analysis determined 0.44% by weight of Li, 15.4% by weight of Mg. 27% by weight of Si and 5.1% by weight of F. The $d_{50}$ value of the primary particles in a 2% aqueous solution is 133 nm. The X-ray diffraction pattern confirms confirms the presence of a silicate having a hectorite structure. The rheological data were recorded using a Carri-med-50 viscometer.

EXAMPLE 2

The procedure is as in Example 1, but using the following solutions:

Solution 1

53 kg of $MgSO_4.7H_2O$ are dissolved in 48 kg of $H_2O$ at 40° C. with stirring in a 250-liter stirred tank.

Solution 2

4.71 kg of NaOH (50% by weight) and 0.69 kg of $Li_2CO_3$ are suspended in 82.6 kg of water in a separate 60-liter stirred container, and 7.05 kg of hydrofluoric acid (40% HF) are metered in with cooling and stirring at a rate such that the evolution of $CO_2$ can be drawn off in a controlled manner. The heat of neutralization increases the temperature to about 65° C. over the course of the addition.

Solution 3

6.9 kg of NaOH (100% by weight), 5.85 kg of $Na_2CO_3$ and 67.5 kg of water glass (8.3% by weight of $Na_2O$, 27.8% by weight of $SiO_2$, type: 4/1, manufacturer: Société Francaise Hoechst) are successively dissolved in 72 kg of water in a 250-liter stirred tank.

Solution 2 is pumped to solution 1 over the course of an hour with stirring and whilst maintaining the abovementioned temperature, and the resulting mixture is then released into a 250-liter high-pressure container. Solution 3 is metered into the mixture over the course of 1 h with vigorous stirring, after which the mixture is heated at 208° C. (internal pressure about 17.5 bar) over the course of from 1.5 to 2 h and stirred for 5 h. The mixture is then cooled to a temperature below 100° C. and half of the resulting suspension (a total of 300 kg) is pumped into an intermediate container containing 150 kg of $H_2O$ (conductivity of the resulting suspension: 71.5 mS, pH=9.5) and washed with a total of 1810 kg of demineralized water in a filtration apparatus connected in the cycle.

The thus purified suspension (solids content 5.9%, pH: 9.8 conductivity: 0.95 mS) is dried in a drying cabinet at 80° C. to give 10.9 kg of dried product, which is broken initially on a hammer mill and ground using a pin mill.

Analysis of the product determines 0.39% by weight of Li, 16.3% by weight of Mg, 26.2% by weight of Si and 5.5% by weight of F. The X-ray diffraction pattern confirms the presence of a silicate having a hectorite structure. The Theological data were recorded using a Carri-med-50 viscometer.

EXAMPLE 3
The procedure was as in Example 1.

Solution 1

226 g of $MgSO_4.7H_2O$ dissolved in 379 g of $H_2O$.

Solution 2

6.34 g of $Li_2CO_3$ and 29.14 g of $MgF_2$ suspended in 284 g of water.

Solution 3

480 g of water, 46 g of NaOH (100% by weight), 39 g of $Na_2CO_3$ and 449.9 g of water glass (8.3% by weight of $Na_2O$, 28.18% by weight of $SiO_2$, type: 4/1, manufacturer: Société Francaise Hoechst).

The solutions were combined as in Example 1 and then the mixture of all the components was stirred slowly at 200° C. for 5 h.

The cooled suspension, which has a pH=10.0, is then washed by repeated centrifugation, decantation of the supernatant salt solution and resuspension of the heavier phase using a total of 8 1 of demineralized water until the conductivity of the suspension is less than 3.6 mS.

Drying at 80° C. in a drying cabinet and grinding in a cross-beater mill gave 183 g of product. Analysis determines 0.48% by weight of Li, 14.5% by weight of Mg, 24.2% by weight of Si and 5.6% by weight of F; the ignition loss is 15.2% and the $d_{50}$ value of the primary particles in 2% aqueous solution is 16 nm. The X-ray diffraction pattern confirms the presence of a silicate having a hectorite structure. The Theological data were recorded using a Carri-med-50 viscometer.

| Yield point (Pa) | Conductivity (mS) |
| --- | --- |
| 0.05 | 0.99 |
| 5.02 | 1.68 |
| 36.68 | 3.05 |

EXAMPLE 4
The procedure was as in Example 1.

Solution 1

226 g of $MgSO_4.7H_2O$ dissolved in 379 g of $H_2O$,

Solution 2

6.34 g of $Li_2CO_3$ and 29.14 g of $Mg(OH)_2$ suspended in 284 g of water, then 47 g of hydrofluoric acid (40% HF), Solution 3

480 g of water, 46 g of NaOH (100% by weight), 39 g of $Na_2CO_3$ and 437 g of water glass (8.3% by weight of $Na_2O$, 28.18% by weight of $SiO_2$, type: 4/1, manufacturer: Société Francaise Hoechst).

The solutions are combined as in Example 1 and then the mixture of all the components is stirred slowly at 200° C. for 5 h.

The cooled suspension, which has a pH=9.0, is then washed by repeated centrifugation, decantation of the supernatant salt solution and resuspension of the heavier phase using a total of 8 l of demineralized water until the conductivity of the suspension is less than 1.3 mS.

Drying at 80° C. in a drying cabinet and grinding in a cross-beater mill gave 189 g of product. Analysis determines 0.51% by weight of Li, 15.4% by weight of Mg, 25.5% by weight of Si and 8.4% by weight of F, and the $d_{50}$ value of the primary particles in a 2% aqueous solution is 245 nm. The X-ray diffraction pattern confirms the presence of a silicate having a hectorite structure. The Theological data were recorded using a Carri-med-50 viscometer.

| Yield point (Pa) | Conductivity (mS) |
| --- | --- |
| 1.01 | 0.67 |
| 41.41 | 1.61 |
| 42.21 | 3.04 |

EXAMPLE 5
The procedure was as in Example 1.

Solution 1

226 g of $MgSO_4.7H_2O$ dissolved in 320 g of $H_2O$,

Solution 2

6.34 g of $Li_2CO_3$ and 46.36 g of $Mg(OH)_2$ x $4MgCO_3$ 4 $H_2O$ suspended in 284 g of water, then 47 g of hydrofluoric acid (40% HF), Solution 3

480 g of water, 46 g of NaOH (100% by weight), 39 g of $Na_2CO_3$ and 449 g of water glass (8.3% by weight of $Na_2O$, 28.38% by weight of $Sio_2$, model: 4/1, manufacturer: Société Francaise Hoechst).

The solutions are combined as in Example 1 and then the mixture of all the components is slowly stirred at 200° C. for 5 h.

The cooled suspension having a conductivity of 76.2 mS is then washed by repeated centrifugation, decantation of the supernatant salt solution and resuspension of the heavier phase using a total of 8 l of demineralized water until the conductivity of the suspension is below 1.61 mS.

Drying at 80° C. in a drying cabinet and grinding in a cross-beater mill gave 190 g of product. The analysis determines 0.54% by weight of Li, 15.5% by weight of Mg, 26% by weight of Si and 5.5% by weight of F, and the $d_{50}$ value of the primary particles in 2% aqueous solution is 151 nm. The X-ray diffraction pattern confirms the presence of a silicate having a hectorite structure. The Theological data were recorded using a Carri-med-50 viscometer.

| Yield point (Pa) | Conductivity (mS) |
| --- | --- |
| 16.08 | 0.99 |
| 26.13 | 1.83 |
| 20.85 | 3.19 |
| 14.5 | 5.44 |

EXAMPLE 6

480 g of water, 12.62 g of NaOH (100%) and 39 g of $Na_2CO_3$ are added to 191.0 g of solid water glass comprising 33.4% by weight of $Na_2O$ and 66.38% by weight of $SiO_2$ (Société Francaise Hoechst) in a stirred container and the mixture is stirred for 1 h. Solutions 1 and 2 are successively metered in and the mixture of all the components is stirred slowly at 195° C. for 5 h.

Solution 1

353.6 g of $MgSO_4.7H_2O$ dissolved in 320 g of $H_2O$

Solution 2

62.88 g of NaOH (50%) and 4.61 g of $Li_2CO_3$ in 284 g of water, and then 47 g of hydrofluoric acid (40% HF).

The cooled suspension having a conductivity of 72 mS and a pH=8.5 is then washed by repeated centrifugation, decantation of the supernatant salt solution and resuspension of the heavier phase using a total of 8 l of demineralized water until the conductivity of the suspension is below 1.58 mS.

Drying at 80° C. in a drying cabinet and grinding in a cross-beater mill gave 179 g of product. The analysis determines 0.53% by weight of Li, 15.1% by weight of Mg, 24.2% by weight of Si and 6.4% by weight of F, and the $d_{50}$ value of the primary particles in 2% aqueous solution is 300 nm. The X-ray diffraction pattern confirms the presence of a silicate having a hectorite structure. The Theological data were recorded using a Carri-med-50 viscometer.

| Yield point (Pa) | Conductivity (mS) |
| --- | --- |
| 15.28 | 1.11 |
| 17.29 | 1.9 |
| 13.07 | 3.2 |
| 5.03 | 5.41 |

EXAMPLES 7 to 11 AND EXAMPLE 12

Examples 7 to 11 used the amounts of starting materials given in Table 1, and the final products were crystallized and, where necessary, purified by the procedures given in Examples 1 to 6. In each case, synthetic sheet silicates were obtained which have the characteristic properties given in Table 1.

In accordance with the preceding instructions, the respective yield points were determined as a function of the conductivity of the suspension, i.e. as a function of the electrolyte content, for Examples 1, 2, 7, 8 and 9 according to the invention and the comparative Examples 10 and 12 (the sheet silicate used in Example 12 is a commercially available synthetic hectorite).

The synthetic magnesium silicates according to the present invention (Examples 1, 2, 7 and 8) have a high yield point, i.e. high pseudoplasticity, even at low electrolyte contents.

The synthetic magnesium silicate according to the present invention (Example 8) has a high yield point at very high electrolyte contents.

TABLE 1

| | Initial weight | | | | | | | Crystallization | | Rheology (2% in distilled water) | |
| --- | --- | --- | --- | --- | --- | --- | --- | --- | --- | --- | --- |
| | $H_2O$ [kg] | $MgSO_4 7H_2O$ [kg] | NaOH [kg] | $Li_2CO_3$ [g] | HF(40% ig) [kg] | $NA_2CO_3$ [kg] | Na 4/1 [kg] | Temperature [° C.] | Time [h] | Yield point [Pa] | Conductivity [mS] |
| Example 1 (according to the invention) | 1.1154 | 0.3511 | 0.0774 | 5 | 0.047 | 0.039 | 0.4466 | 200 | 5 | 29.55<br>44.72<br>38.69<br>5.025 | 0.63<br>1.50<br>3.04<br>6 |

TABLE 1-continued

Rheology

| | Initial weight | | | | | | | Crystallization | | Yield Rheology (2% in distilled water) | |
|---|---|---|---|---|---|---|---|---|---|---|---|
| | H₂O [kg] | MgSO₄7H₂O [kg] | NaOH [kg] | Li₃CO₃ [g] | HF(40% ig) [kg] | NA₂CO₃ [kg] | Na 4/1 [kg] | Temperature [°C.] | Time [h] | point [Pa] | Conductivity [mS] |
| Example 2 (according to the invention) | 162.6 | 53.04 | 11.61 | 690 | 7.05 | 5.85 | 67.5 | 208 | 5 | 25.33<br>38.89<br>44.02 | 0.49<br>0.95<br>1.31 |
| Example 7 (according to the invention) | 162.6 | 53.4 | 11.61 | 633 | 7.05 | 5.85 | 67.5 | 208 | 5 | 45.53 | 0.87 |
| Example 8 (according to the invention) | 1.1154 | 0.3536 | 0.0774 | 4.6 | 0.047 | 0.039 | 0.4466 | 200 | 5 | 46.73 | 0.77 |
| Example 9 (according to the invention) | 1.1154 | 0.34082 | 0.08 | 6.54 | 0.047 | 0.039 | 0.4466 | 200 | 5 | 1<br>20.45<br>47.45<br>40.1<br>6.553 | 0.52<br>1.48<br>3<br>5.57<br>9.22 |
| Example 10 (comparison) | 1.1154 | 0.3608 | 0.0774 | 3.4 | 0.047 | 0.039 | 0.4467 | 200 | 5 | 35.88 | 1.37 |
| Example 11 (comparison) | 162.6 | 51.3 | 11.61 | 990 | 7.05 | 5.85 | 68.4 | 206 | 5 | 0.1005 | 0.96 |
| Example 12 (commercially available synthetic hectorite) | | | | | | | | | | 0.201<br>0.5<br>0.402<br>12.96<br>39.7<br>47.3<br>43.25<br>9.535<br>2.322<br>1.98 | 0.043<br>0.5<br>0.66<br>0.86<br>1.1<br>1.4<br>2.9<br>5.3<br>7.7<br>10.1 |

The fiber affinities of the synthetic magnesium silicates of Examples 1, 2 and 7 to 9 according to the invention were also compared with those of natural bentonites (I to III) and the product from Example 11.

TABLE 2

Fiber affinities

| | Fiber affinity |
|---|---|
| Example 1 | 82.9 |
| Example 2 | 82.3 |
| Example 7 | 81.3 |
| Example 8 | 95.6 |
| Example 9 | 97.9 |
| (all according to the invention) | |
| Example 11 (Comparison) | 80.8 |
| nat. Bentonite I | 70.1 |
| nat. Bentonite II | 69.5 |
| nat. Bentonite III | 61.8 |

The synthetic magnesium silicates of Examples 1, 2 and 7 to 9 according to the invention display considerably higher fiber affinities than the magnesium silicate from Example 11 and especially compared with the natural bentonites.

What is claimed is:

1. A synthetic magnesium silicate having a layered crystalline structure of the formula $$[Mg_{3-x}-Li_xSi_4O_{10}(OH)_{2-y}F_y]^{x-\ x/z}M^{z+}$$

where $0.1 \leq x \leq 0.4$ and $0 < y \leq 2$,

M is an alkali metal ion having a valency z and in which the molar relationship of the fluorine mole content ($C_F$) to the silicon mole content ($C_{si}$) in the final product is $$C_F[\text{mols}] = -1.92\ C_{si}[\text{mols}] + b$$

where $b = 2.18$ to $2.02$ wherein said silicate is made from a reaction mixture having atomic ratios: Mg/Si=0.7144 to 0.6405; Li/Si=0.02464 to 0.09854; Si/F=2.04 to 2.49; Na/Si= 0.9514 to 2.0298; and the ratio of H₂O to Sio₂ is from about 14:1 to 43:1 with the proviso that the ratio of Li/Mg is from 0.079 to 0.096.

2. The synthetic magnesium silicate having a layered crystalline structure as claimed in claim 1, wherein $0.21 \leq x \leq 0.33$.

3. The synthetic magnesium silicate having a layered crystalline structure as claimed in claim 1, wherein $0.21 \leq x \leq 0.28$.

4. The synthetic magnesium silicate having a layered crystalline structure as claimed in claim 1, which produces pseudoplasticity in aqueous solutions with a low or high electrolyte content.

5. The synthetic magnesium silicate having a layered crystalline structure as claimed in claim 1, which has an affinity to textile fibers.

6. A process for using the synthetic sheet silicates as claimed in claim 1, comprising incorporating said sheet silicates into an aqueous solution, a beverage, a crop-protection formulation, a catalyst, or a fabric softener.

7. A process for the preparation of synthetic magnesium silicates having a layered crystalline structure of the formula

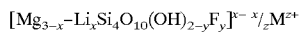

where $0.1 \leq x \leq 0.4$ and $0 < y \leq 2$,

M is an alkali metal ion having a valency z and in which the relationship of the fluorine molar content ($C_F$) to the silicon molar content ($C_{si}$) in the final product is $$C_F[\text{mols}] = -1.92 \, C_{si}[\text{mols}] + b$$

where b=2.18 to 2.02 said process, which comprises
reacting an aqueous $MgSO_4$ solution with an aqueous solution containing lithium ions and fluoride ions, subsequently adding a silicon compound to form a reaction mixture before crystallization, and after said addition of silicon compound, heating at autogenous pressures at from at from 100° to 320° C. for from 2 to 24 hours, then cooling, and separating said magnesium silicate from byproducts, then washing said magnesium silicate, wherein before crystallization the atomic ratios in said reaction mixture are: Mg/Si=0.7144 to 0.6405; Li/Si=0.02464 to 0.09854; Si/F=2.04 to 2.49; Na/Si=0.9514 to 2.0298; and the ratio of $H_2O$ to $SiO_2$ is from about 14:1 to 43:1 with the proviso that the ratio of Li/Mg is from 0.079 to 0.096.

8. The process as claimed in claim 7, wherein the reaction mixture is heated at from 170 to 220° C. for from 3 to 8 hours.

9. The process as claimed in claim 7, wherein the molar ratio of
Mg/Si=0.6873 to 0.6578 and
Li/Si=0.05173 to 0.0813.

10. The process as claimed in claim 7, wherein the molar ratio of
Mg/Si=0.6873 to 0.6701 and
Li/Si=0.05173 to 0.0898.

11. The process as claimed in claim 7, wherein the magnesium silicate is subsequently ground.

12. A synthetic, purified magnesium silicate having a layered crystalline structure of the formula

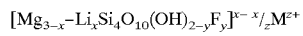

where $0.21 \leq x \leq 0.33$ and $0 < y \leq 2$,

M is an alkali metal ion having a valency z and in which the molar relationship of the fluorine mole content ($C_F$) to the silicon mole content ($C_{si}$) in the final product resulting from said reaction mixture is $$C_F[\text{mols}] = -1.92 \, C_{si}[\text{mols}] + b$$

where b=2.18 to 2.02 said magnesium silicate exhibiting a high yield point in solutions containing low electrolyte concentration, and wherein said magnesium silicate is derived from a reaction mixture, before crystallization, having atomic ratios of constituents in said reaction mixture of: Mg/Si=0.6750 to 0.6849; Li/Si=0.05420 to 0.06405; Si/F=2.04 to 2.49; Na/Si=0.9514 to 2.0298; and the ratio of $H_2O$ to $SiO_2$ is from about 14:1 to 43:1 with the proviso that the ratio of Li/Mg is from 0.079 to 0.096.

13. A synthetic, purified magnesium silicate having a layered crystalline structure of the formula

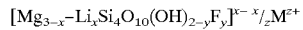

where $0.21 \leq x \leq 0.33$ and $0 < y \leq 2$,

M is an alkali metal ion having a valency z and in which the molar relationship of the fluorine mole content ($C_F$) to the silicon mole content ($C_{si}$) in said reaction mixture is $$C_F[\text{mols}] = -1.92 \, C_{si}[\text{mols}] + b$$

where b=2.18 to 2.02 said magnesium silicate exhibiting pseudoplasticity in solutions containing high or low electrolyte concentration, and wherein said magnesium silicate is derived from a reaction mixture, before crystallization having atomic ratios of constituents in said reaction mixture of: Mg/Si=0.6528 to 0.6627; Li/Si=0.0764 to 0.0862; Si/F=2.04 to 2.49; Na/Si=0.9514 to 2.0298; and the ratio of $H_2O$ to $SiO_2$ is from about 14:1 to 43:1 with the proviso that the ratio of Li/Mg is from 0.079 to 0.096.14

* * * * *